United States Patent [19]

Rodriguez

[11] 4,095,261

[45] June 13, 1978

[54] AUDIO TAPE RECORDER, EDITOR AND AMPLIFYING SYSTEM

[76] Inventor: Jesus Rodriguez, 1966 First Ave., No. 3C, New York, N.Y. 10029

[21] Appl. No.: 647,079

[22] Filed: Jan. 7, 1976

[51] Int. Cl.² ............................................. G11B 27/02
[52] U.S. Cl. ......................................... 360/13; 360/63
[58] Field of Search ...................... 360/13, 14, 15, 16, 360/61, 62, 67, 63

[56] References Cited

U.S. PATENT DOCUMENTS

| | | | |
|---|---|---|---|
| 3,295,853 | 1/1967 | Cheng | 360/13 |
| 3,519,762 | 7/1970 | Morris | 360/15 |
| 3,521,009 | 7/1970 | Auld | 360/94 |
| 3,778,558 | 12/1973 | Wick | 360/13 |
| 3,939,489 | 2/1976 | Kawashima | 360/13 |

*Primary Examiner*—Jay P. Lucas
*Attorney, Agent, or Firm*—Robert D. Farkas

[57] ABSTRACT

This disclosure pertains to a public address apparatus comprising a portable dual track tape recorder — playback unit having individual stationary electromagnetic dual purpose recording and playback heads feeding selectively independently the input of a single channel audio amplifier and speaker system. The audio amplifier is provided with two additional output terminals, each of which is independently capable of providing recording currents to each recording head as desired. Additional inputs are provided accommodating microphones and radio receivers.

6 Claims, 2 Drawing Figures

AUDIO TAPE RECORDER, EDITOR AND AMPLIFYING SYSTEM

BACKGROUND OF THE INVENTION

1. The Field of the Invention

This invention relates to public address systems in combination with tape recording - playback units devised to facilitate voice accompanyment to prerecorded music or messages.

2. Description of the Prior Art

The prior art is replete with various apparatus designed to provide portable paging public address systems and otherwise disassociated monoral or stereophonic tape recorders.

SUMMARY OF THE INVENTION

This invention describes a portable apparatus which is adapted to reproduce in amplified fashion, sounds picked up by a microphone or electromagnetic radiations converted into audible signals. The same amplification and reproduction system is provided selectively simultaneously with the information contained on the tracks of a two track electromagnetically recorded tape strip. If both tracks are used in the playback mode, the information contained thereon is simultaneously provided to the input of the audio amplifier. Alternatively, one track may be used in the playback mode with or without the external audio signal being added to it, whilst the other track is being used in the recording mode, recording the output signal equivalent to the audible tones being generated by the speaker. Thus the user may use the apparatus as a conventional paging system, or to playback one track only, or to playback one track and accompany the recorded information thereon by the use of the microphone, or to playback both tracks, or to playback both tracks and accompany the information recorded therein by the use of the microphone, or to playback one track and accompany it by the use of the microphone whilst recording on the second track and the reverse combination thereof, or to utilize the microphone to page or otherwise transmit information and simultaneously record this information on either track, or to produce a sound on sound effect by repeating the previous steps indefinitely. Independent volume controls are provided to permit the sounds eminating from the speaker to be controlled in amplitude at will, in addition to independent controls for each playback head when in the playback mode and the external imput channels. A dummy load impedance substitutes the impedance of the recording - playback head when the head is utilized in the recording mode to maintain a minimum impedance level at the individual recording output terminals of the amplifier when not in use.

A primary object of the instant invention is to provide a portable public address system combined with a dual track tape recorder - playback unit having at least three audio imput channels.

Another object is to provide a portable apparatus having capabilities to produce simultaneous signals from dual prerecorded tracks eminating from one speaker.

Still another object is to provide an apparatus which can combine either or both of two individual signals produced by tape soundtracks and externally produced audio voltage signals into a combined signal.

A further object is to provide a recorder which selectively permits audio monitoring simultaneously of a signal as it is being recorded combined with a signal representing an additional prerecorded signal.

These objects, as well as other objects of this invention, will become readily apparent after reading the following description of the accompanying drawings.

DESCRIPTION OF THE PREFERRED EMBODIMENT

Figure 1:
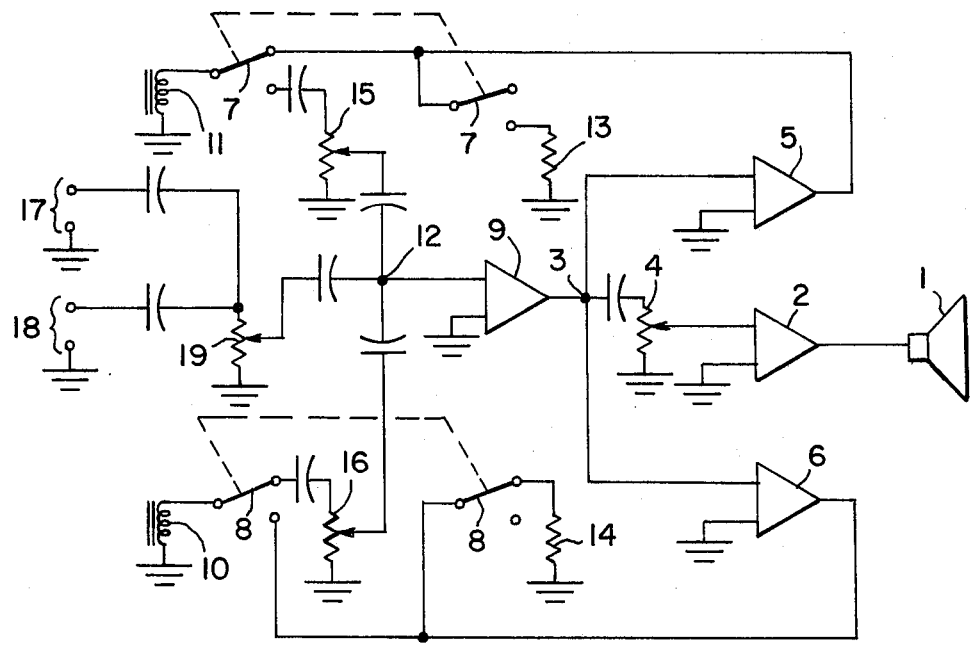
FIG. 1 is a combined block diagram and schematic representation of the public address apparatus.

The structure and method of fabrication of the present invention is applicable to a public address apparatus adapted with a conventional tape deck having two stationary recording - playback heads mounted adjacent the coded surface of the tape. Each heads scans individual parallel longitudinal strips resulting in two parallel tracks capable of recording and reproducing audio signals. Conventional stopping, starting, fast forward, fast reverse controls may be provided. The apparatus may be constructed to accommodate cartridge or cassette type reel to reel miniature tape units which may have one or both tracks prerecorded with musical selections.

Each head and an external audio input jack is adapted with individual volume controls, each feeding an input signal terminal. The input signal terminal inturn feeds a multi channel audio amplifier. The center channel is preceeded by an individual volume control, having its output terminals connected to a speaker. Thus recorded information from either or both of the recording - playback heads and signals applied to the external audio input terminals are mixed and jointly independently controlled in amplitude before being commonly reproduced by the speaker.

The input signal terminal feeds left and right channel recording amplifier stages, whose output terminals are connected to independently controlled left channel and right channel selector switches. The channel selector switches manually selectively disconnect individually each recording - playback head from its volume control feeding the imput signal terminal and complete the connection between each individual recording - playback head to the appropriate output terminal of a recording amplifier stage. In order to protect the output stages because of the change of an impedance level experienced when its related recording - playback head is in the playback switched position, a dummy load resistor is inserted in the place of the recording - playback head by the switch device.

Each individual channel may thus provide individual audio information to the center imput signal terminal that can be reproduced by the speaker. The external audio input terminal may be utilized to provide vocal information in addition thereto. Alternatively, a single recording - playback head and the apparatus connected to the external audio input terminal may, at independent volume levels, produce sounds at the speaker in independently controlled amounts, whilst such information is being simultaneously recorded on the remaining recording - playback head. Thus, sound on sound effects eminating from live or prerecorded signals may be recorded and if desired, monitored or reproduced through the speaker. Turning down each side channel volume control whilst both record - playback side channel selector switches are in the record mode, enables the apparatus to be utilized as a conventional public address system.

Broad usage of this apparatus is envisioned in such applications as portable paging systems for live or prerecorded messages, amusement devices permitting vocal accompanyment to prerecorded single or dual track musical compositions, recording of sales or other field aquired information on portable apparatus which can publically present sales information during trade shows and the like, and stenographic dictating and reproduction apparatus enabling the dictating party to edit his initial track transcription by recording on the alternate track at any desired point thereof. By successive uses of alternate recording and playback, infinite subsequent external signals may be combined onto one track by repeated alternations between playback on one channel and recording on the other whilst adding audio signals to the external input terminals. A throat microphone or otherwise feed back protected sound detecting instrument enables the user to listen to the information being reprodueced audibly by the speaker. The apparatus may be adapted with a radio receiver connected to one of the external input signal terminals.

Now referring to the FIGS. and more particularly to the embodiment illustrated in FIG. 1 showing a speaker 1 connected to the output terminals of an audio amplifier 2. Signal imput terminal 3 provides signal information to volume control 4 which controls the amplitude of the signal to be amplified by at least one stage of amplification present in amplifier 2. Thus, volume control 4 will control the amplitude of the sounds eminating from speaker 1 generating from signals present at input signal terminal 3. Left channel amplifier 5 and right channel amplifier 6 have their input connected to input signal terminal 3 and produce an output signal which is controlled by switches 7 and 8 successively. In practise, amplifier stages 5 and 6 may be supplanted by a single amplifier or may be deleted if amplifier 9 has sufficient output power to drive recording - playback heads 10 and 11. If individual amplifiers 5 and 6 are employed, amplifier 9 may be deleted and substituted by a jumper between input signal terminal 3 and junction 12. Switch 7 provides recording power to recording - playback head 11 in the switch position indicated. Switch 8 substitutes a fixed impedance 14 for the recording playback head 10 in the switch position shown. Impedance 13 is disconnected from the output terminals of amplifier 5, as shown, because switch 7 places the similar impedence of the recording - playback head 11 across the output terminals of amlifier 5. Recording - playback head 10 is shown connected to volume control 16 which controls the amplitude of the signal fed to junction 12 obtained by the recording - playback head 10 shown in the playback mode. Similarly, volume control 15 will control the amplitude of the signals produced by recording - playback head 11 when in the playback mode to be coupled to junction 12. Auxiliary audio input terminals 17 and 18 are utilized to introduce external audio signals to volume control 19 which feeds junction 12. Amplifiers 5 and 6 may be of the type which automatically adjusts the amplitude of the output recording current made available to recording - playback heads 10 and 11, when in the recording mode to compensate for variations in amplitude of the signal present at signal input terminal 3.

The signals present at imput signal terminal 3 may be a composite of the playback voltages produced by the recording - playback heads 10 and 11 and the external signals introduced at auxiliary audio input terminals 17 and 18. A prerecorded signal may be introduced from playback head 11 accompanied by an audio signal produced at auxiliary imput terminal 17 which may or may not be monitored by speaker 1 whilst the combined signal is being recorded on the track affected by recording - playback head 10. Combinations of recording and playback and external signals may be simultaneously monitored by the speaker by permitting volume control 4 to couple the signal present at input signal terminal 3 to the input terminals of amplifier 2.

Figure 2:
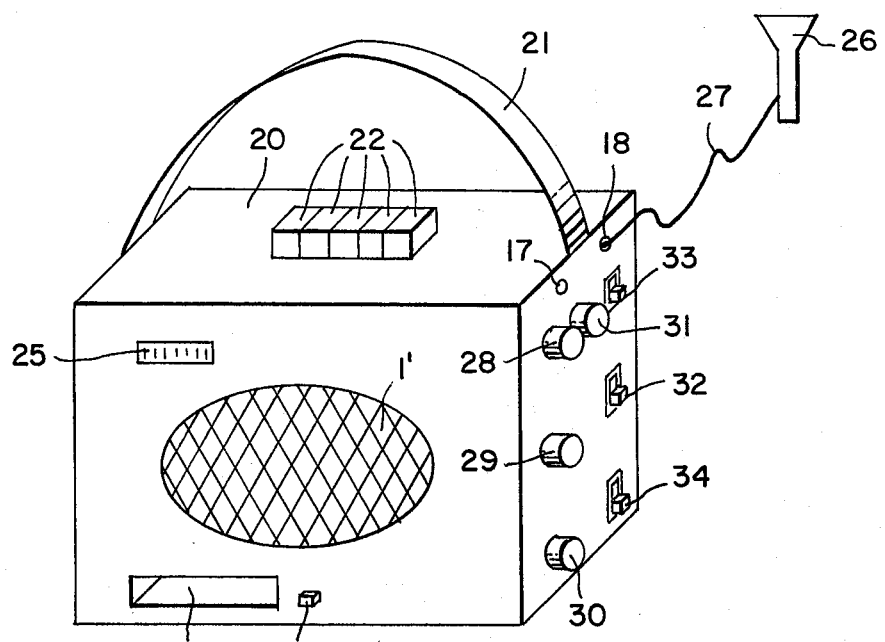
FIG. 2 is a perspective view of the public address apparatus.

FIG. 2 shows an enclosure 20 adapted to be carried by strap 21. Push buttons 22 control the motor functions not shown, required to transport the tape cartridge or cassette inserted in window opening 23. Stop, play, record, fast forward, and fast reverse buttons 22 are provided. A cartridge or cassette eject button 24 permits the cartridge or cassette to be withdrawn from window 23 as required. Counter 25 indicates the position of the tape within the cartridge or cassette, facilitating, in the conventional manner, retreival of recorded information or positioning of unrecorded tape areas as required. Speaker grill 1' covers the port opening through which sounds eminating from speaker 1, as shown in FIG. 1, pass. auxiliary input terminals 17 and 18 are adapted to be available at the outside of the enclosure 20 facilitating thereby convenient insertion of a suitable plug, not shown, connecting external audio devices, not shown, to the apparatus. Microphone 26 is connected through cable 27 into auxiliary input terminal 18. Microphone 26 may be of the throat microphone variety minimizing feedback paths to the sounds eminating from grill 1' or may be of the conventional unidirectional variety if the microphone is properly placed at a substantial distance from speaker grill 1'. Knobs 28, 29, and 30 control volume controls 15, 4, and 16 respectively as shown in FIG. 1. Knob 31 controls volume control 19 as shown in FIG. 1. Switch knob 32 controls the supply of battery voltage or external line voltage to the entire electrical system located within the enclosure 20. Switch knob 33 and switch knob 34 control switches 7 and 8 respectively as shown in FIG. 1. Switch knob 32 would be identified with "on-off" notation. Switch knobs 33 and 34 would be identified with "record" and "playback" notations. The enclosure 20 may, if desired, house a radio receiver of either or both the amplitude and frequency modulated types with the appropriate control knobs and dials available therethrough.

One of the advantages is a portable address system combined with a dual track tape recorder - playback unit having at least three audio input channels.

Another advantage is a portable apparatus having capabilities to produce simultaneous signals from dual prerecorded tracks eminating from one speaker.

Still another advantage is an apparatus which can combine either or both of two individual signals produced by tape soundtracks and external produced audio voltage signals into a combined signal.

A further advantage is a recorder which selectively permits audio monitoring simultaneously of a signal as it is being recorded combined with a signal representing an additional prerecorded signal.

Thus, there is disclosed in the above description and in the drawings, an embodiment of the invention which fully and effectively accomplishes the objects thereof.

However, it will become apparent to those skilled in the art, how to make variations and modifications to the instant invention. Therefore, this invention is to be limited not by the specific disclosure herein, but only by the appending claims.

The embodiment of the invention in which an exclusive privilege or property is claimed are defined as follows:

I claim:

1. A public address apparatus comprising dual track magnetically sensitive tape transport means, first and second recording heads being also capable of reproducing and electromagnetically coupled to individual longitudinal recording tracks on a unitary magnetically sensitive tape strip and not to each other, a signal input terminal electrically coupled to the input terminals of a first audio voltage amplifier having an audio speaker at the output terminals thereof, second and third audio voltage amplifiers, said second and said third audio voltage amplifiers having input terminals, said second and said third audio voltage amplifier input terminals connected to said signal input terminal, the output terminals of said second audio voltage amplifier connected to a first switch means, the output terminals of said third audio voltage amplifier connected to a second switch means, said first switch means adapted to alternatively selectively connect said first recording head to the output terminals of said second audio voltage amplifier and said signal input terminals, said second switch means adapted to alternatively selectively connect said second recording head to the output terminals of said third audio voltage amplifier and said signal input terminal, means to connect an audio frequency voltage signal to said signal input terminal.

2. The public address apparatus as claimed in claim 1 wherein said first and said second switch means further comprises individual dummy load impedences connected across each of said output terminals of said second and third audio voltage amplifiers upon individually manually switchably connecting said first recording head to said signal input terminal and said second recording head to said signal input terminal.

3. The public address apparatus as claimed in claim 1 further comprising means to manually individually vary the amplitude of the audio voltages at said signal input terminal from the amplitude of the audio voltages individually present at said first and said second recording heads.

4. The public address apparatus as claimed in claim 1 further comprising means to manually vary the amplitude of the audio voltage signal at said input terminals of said first audio voltage amplifier from the amplitude of the audio voltage present at said input signal terminal.

5. The public address apparatus as claimed in claim 1 further comprising means to amplify the audio voltage signals between said signal input terminal and the input terminals of said first audio voltage amplifier.

6. The public address apparatus as claimed in claim 1 wherein said means to connect an audio frequency voltage signal to said signal input terminal further comprises a microphone.

* * * * *